United States Patent [19]

Holzman

[11] 4,137,712

[45] Feb. 6, 1979

[54] FLUIDIC COMBUSTION CONTROL OF A SOLID FUEL RAMJET

[75] Inventor: Allen L. Holzman, Sunnyvale, Calif.

[73] Assignee: The United States of America as represented by the Secretary of the Navy, Washington, D.C.

[21] Appl. No.: 840,939

[22] Filed: Oct. 11, 1977

Related U.S. Application Data

[63] Continuation-in-part of Ser. No. 702,642, Jul. 6, 1976, abandoned.

[51] Int. Cl.² ............................................. F02K 7/10
[52] U.S. Cl. ..................................... 60/251; 60/270 S
[58] Field of Search ................... 60/251, 270 R, 270 S

[56] References Cited

U.S. PATENT DOCUMENTS

| 2,628,473 | 2/1953 | Frye | 60/270 R |
| 3,782,112 | 1/1974 | Muzzy | 60/251 |
| 3,844,118 | 10/1974 | Wilkinson | 60/270 S |
| 4,031,698 | 6/1977 | Humphrey et al. | 60/270 S |
| 4,052,846 | 10/1977 | Schadow | 60/270 S |

FOREIGN PATENT DOCUMENTS 751013  6/1956  United Kingdom ................... 60/39.72

*Primary Examiner*—Robert E. Garrett
*Attorney, Agent, or Firm*—R. S. Sciascia; Roy Miller

[57] ABSTRACT

Fluidic combustion control of a ramjet by injecting a fluid into the base or recirculation region to reduce the critical injection parameter, or to shut down the ramjet without affecting the hot air flow.

6 Claims, 1 Drawing Figure

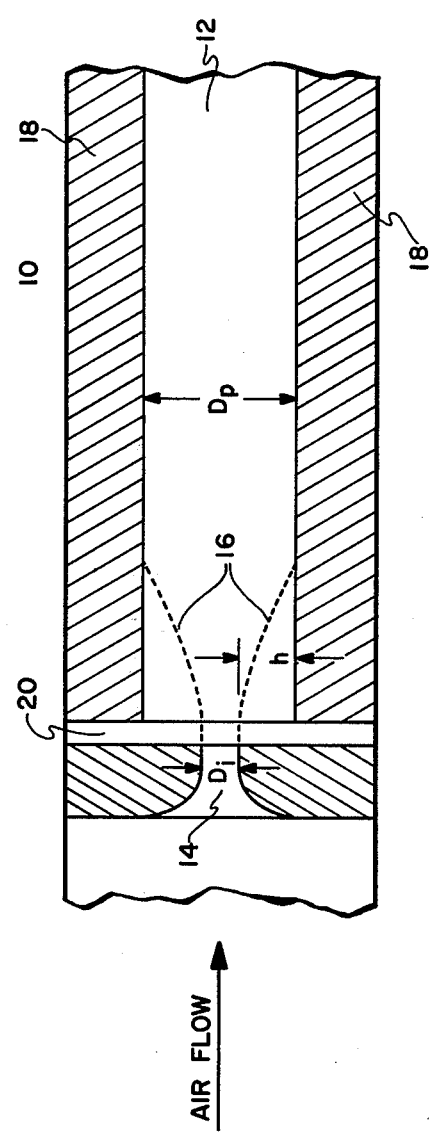

FLUIDIC COMBUSTION CONTROL OF A SOLID FUEL RAMJET

CROSS-REFERENCE TO RELATED APPLICATION

This application is a Continuation-in-part of copending U.S. patent application Ser. No. 702,642, filed 6 July 1976, now abandoned.

BACKGROUND OF THE INVENTION

Early efforts to burn solid hydrocarbons in the ramjet mode encountered difficulties in reliable flame holding. Ramjet technology, using oxidizer-free solid fules, developed rapidly after the role of the sudden expansion flame holder as a reliable method of flame stabilization for SFRJs was recognized.

At first, it might appear that the application of the sudden expansion flame holder to SFRJs represents no new technology since the technique has been used successfully for many years in liquid ramjet combustors.

However, a major difference exists between the two systems. In the liquid ramjet, fuel and air are premixed to the desired equivalence ratio. This assures combustion at proper flow speed by dumping into a sudden expansion chamber. In the SFRJ, air alone is dumped into the sudden expansion region.

In the SFRJ, a recirculation zone is formed in the expansion region which becomes the flame holder. The correct range of fuel-to-air flow ratio must be internally generated within the recirculation zone to achieve flame stabilization. Fuel is gasified and mixed inside the combustion chamber instead of being premixed with air. Additionally, the fuel-air mixture in the flame holding region is not necessarily at the stoichiometric composition.

The method of fuel addition is in turn dependent upon the combustion process. A turbulent flame transfers heat to the fuel surface (which constitutes the wall of the combustion chamber), causing fuel gasification. The turbulent flame is established between the fuel surface and the boundary layer.

Flame holding in SFRJs occurs in the recirculation zone behind a rearward facing step or sudden expansion region at the heat end of the fuel grain. Heat transfers to the fuel surface during the ignition phase and results in a gasified fuel being injected into the recirculation zone. Simultaneously, a small fraction of the air streaming through the injector becomes entrained and a stable flame is formed in the recirculation zone.

A current hypothesis regarding the flame holding mechanism is that stabilization is achieved when the local mixture ratio in the recirculation zone is within the lean and rich combustion limits of the fuel. For hydrocarbons, this range of stability generally lies between equivalence ratios ($\Phi$) of 0.5 and 1.5.

The limiting injection parameter is the dimensionless parameter $h/D_p$ or the $A_p/A_i$, where $h = \frac{1}{2}(D_p - D_i)$, $D_p$ = diameter of fuel port, $D_i$ = diameter of injector port, $A_p$ = area of fuel port, and $A_i$ = area of injection port. Many fuels of interest have critical ($h/D_p$) above that which would be desired. This increases the injector pressure drop for fixed $D_p$ and air flow conditions since $\Delta P \sim D_i^4$, where $\Delta P$ = injector pressure drop.

Because of the continuing interest in reducing the critical ($h/D_p$) of ramjet solid fuels, an attempt was made to get a lower value by indirect means. However, the fuel systems having lower critical $A_p/A_i$ have up to 6% lower theoretical performances due to their use of ammonium perchlorate (AP) and HYCAT (a ferrocene compound, burning rate accelerator described in U.S. Pat. No. 3,864,178).

Premature shutdown of a SFRJ is only possible by shutting the air flow off. There are more applications, such as flares or nonpropulsive devices, whose on-off operation and multiple firings are of interest.

SUMMARY OF THE INVENTION

The present invention provides for fluidic combustion control of a ramjet by injecting oxygen into the base or recirculation region of the ramjet to reduce the critical injection parameter, $h/D_p$, or by injecting nitrogen into the recirculation zone of the ramjet to shut down the ramjet.

BRIEF DESCRIPTION OF THE DRAWING

The FIGURE shows a cross-sectional view of part of the "stovepipe" of a ramjet.

DESCRIPTION OF THE PREFERRED EMBODIMENT

Referring now to the FIGURE, a casing or "stovepipe" 10 of a ramjet has a sustainer region 12 with a diameter $D_p$, area $A_p$, and an injector region 14 with a diameter $D_i$, area $A_i$. Adjacent the injector region 14 at the head end of the sustainer region 12, is a base or recirculation region 16. A solid fuel 18 lines the interior of the casing 10 in the sustainer region 12. A fluid, such as oxygen or nitrogen is introduced into the recirculation zone 16 through an annular slot 20 which is maintained between the headend of the fuel 18 and the base region of the injector orifice 14. The particular fluid injected into the recirculation zone 16 through the annular slot 20 determines whether the critical injection parameter, $h/D_p$, is reduced, or whether the ramjet is shut down.

If oxygen is injected into the recirculation zone 16, the $h/D_p$ can be reduced to values as low as 0.06 where normally the ramjet would not operate below a $h/D_p$ of 0.145. The closer the $h/D_p$ is to the critical value, i.e., 0.145, the less oxygen is required for sustaining combustion below this value. At the $h/D_p$ of 0.06, the oxygen/air weight ratio is 0.0005. Thus, oxygen injection enhances the flame holding region to effect the $h/D_p$ reduction. A gas source containing 50% or more oxygen is effective.

The fuel is UTX-14,175 which is 25% cross-linked polystyrene and 75% hydroxy-terminated polybutadiene with a $h/D_p$ critical of 0.145 and $A_p/A_i$ critical of 2.00.

To shut down the ramjet, nitrogen is injected into the recirculation zone 16. The closer the $h/D_p$ is to the critical value, the less nitrogen it takes to put out the combustion. A nitrogen flow of 1% to 5% of the air flow for less than 200 milliseconds is sufficient for combustion termination. Thus, nitrogen injection eliminates the flame holding region to effect combustion termination. A gas source containing 80% of more nitrogen would be effective.

The concept of enhancement or elimination of a flame holding region is applicable to liquid fuel ramjets as well as solid fuel ramjets, and is accomplished without affecting the hot air flow through the ramjet.

What is claimed is:

1. A fluidic combustion control system for a solid fuel ramjet comprising;

a ramjet casing;

a sustainer region in said casing lined with a solid fuel having an internal diameter $D_p$ and having a head end;

an injector means forwardly of said sustainer region and having an internal diameter $D_i$, a recirculation zone at the head end of said sustainer region and adjacent said injector means, said solid fuel normally having a critical injection parameter $h/D_p$ below which combustion will not be sustained where h equals $\frac{1}{2}(D_p - D_i)$;

a source of gas; and means for introducing said gas into said recirculation zone to control the combustion within said sustainer region by altering the critical injection parameter of said solid fuel.

2. A fluidic combustion control system as set forth in claim 1 wherein;

said source of gas contains oxygen in excess of 50%.

3. A fluidic combustion control system as set forth in claim 1 wherein;

said source of gas contains nitrogen in excess of 80%.

4. A method for fluidic combustion control of a solid fuel ramjet having a sustainer region lined with a solid fuel having an internal diameter $D_p$ and having a head end, an injector means having an internal diameter $D_i$ and a recirculation zone at the head end of said sustainer region and adjacent said injector means, said fuel having a critical injection parameter $h/D_p$ below which combustion will not be sustained where $h=\frac{1}{2}(D_p-D_i)$, comprising the steps of:

supplying airflow to said injector means, and injecting a gas into the recirculation zone to alter the critical injection parameter of the fuel.

5. A method as set forth in claim 4 wherein;

said gas contains more than 50% oxygen.

6. A method as set forth in claim 4 wherein said gas contains more than 80% nitrogen.

* * * * *